(12) United States Patent
Psenak et al.

(10) Patent No.: US 12,132,606 B2
(45) Date of Patent: *Oct. 29, 2024

(54) SIGNALING A PREFIX UNREACHABILITY IN A NETWORK UTILIZING A ROUTE SUMMARIZATION

(71) Applicant: Cisco Technology, Inc., San Jose, CA (US)

(72) Inventors: Peter Psenak, Bratislava (SK); Lester C. Ginsberg, Mount Hermon, CA (US); Ketan Jivan Talaulikar, Pune (IN); Clarence Filsfils, Brussels (BE); Francois Clad, Strasbourg (FR); Stephane Litkowski, Liffre (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,246

(22) Filed: Jun. 30, 2023

(65) Prior Publication Data

US 2023/0396486 A1 Dec. 7, 2023

Related U.S. Application Data

(63) Continuation of application No. 17/342,899, filed on Jun. 9, 2021, now Pat. No. 11,736,340.

(51) Int. Cl.
*H04L 41/0654* (2022.01)
*H04L 41/0631* (2022.01)
*H04L 41/0686* (2022.01)

(52) U.S. Cl.
CPC ...... *H04L 41/0654* (2013.01); *H04L 41/0631* (2013.01); *H04L 41/0686* (2013.01)

(58) Field of Classification Search
CPC ..... H04L 41/00; H04L 41/06; H04L 41/0631; H04L 41/0654–0668; H04L 41/0677;
(Continued)

(56) References Cited

U.S. PATENT DOCUMENTS 10,419,328 B1 9/2019 Dave
11,736,340 B2 * 8/2023 Psenak ................ H04L 41/0686
(Continued)

FOREIGN PATENT DOCUMENTS

WO 2017118880 7/2017

OTHER PUBLICATIONS

"IP Routing: BGP Configuration Guide," Updated on Feb. 13, 2017, 13 Pages, [Retrieved on Sep. 26, 2019], Retrieved from URL: https://www.cisco.com/c/en/us/td/docs/ios-xml/ios/iproute_bgp/configuration/xe-16/irg-xe-16-book/irg-xe-16-book_chapter_01010101.html, 2019.

(Continued)

*Primary Examiner* — Boris D Grijalva Lobos
(74) *Attorney, Agent, or Firm* — Polsinelli P.C.

(57) ABSTRACT

The present technology is directed to signaling unreachability of a network device, more specifically, a prefix of the network device in network that utilizes route summarization. A pulse trigger agent can detect an unreachability of at least one Provider Edge (PE) device in a network domain of a network and determine that a route summarization is being used within the network where the unreachability of the at least one PE device is hidden by the route summarization. A pulse distribution agent can transmit a failure message informing other PE devices of the unreachability of the at least one PE device.

20 Claims, 11 Drawing Sheets

(58) Field of Classification Search
CPC ....... H04L 41/069; H04L 43/00; H04L 43/02; H04L 43/06; H04L 43/0686; H04L 43/08–0817; H04L 43/10
See application file for complete search history.

(56) References Cited

U.S. PATENT DOCUMENTS

| | | |
|---|---|---|
| 2004/0174825 A1 | 9/2004 | Li et al. |
| 2010/0061230 A1 | 3/2010 | Xiong et al. |
| 2012/0075986 A1 | 3/2012 | Lu et al. |
| 2012/0287935 A1 | 11/2012 | Swallow et al. |
| 2014/0003281 A1 | 1/2014 | Han et al. |
| 2015/0117178 A1 | 4/2015 | Kotalwar |
| 2016/0248663 A1* | 8/2016 | Patel .................. H04L 45/24 |
| 2021/0119938 A1 | 4/2021 | Pelekhaty et al. |
| 2021/0234777 A1 | 7/2021 | Ji et al. |
| 2022/0224629 A1 | 7/2022 | Mada et al. |

OTHER PUBLICATIONS

Patel K., et al., "Use Cases for an Interface to BGP Protocol draft-keyupate-i2rs-bgp-usecases-01.txt", Network Working Group, 2014, pp. 1-17.

Singh D., "Yet Another New BGP NLRI: BGP-LS," Downloaded on Sep. 26, 2019, 20 Pages, Retrieved from URL: https://packetpushers.net/yet-another-new-bgp-nlri-bgp-ls/, Packet Pushers, 2015.

Stretch, "BGP Route Aggregation—Part 1", Packet Life, Sep. 19, 2008, 9 Pages.

* cited by examiner

Full-mesh structure after discovery

Initial state (before discovery)

Tree structure after discovery

SIGNALING A PREFIX UNREACHABILITY IN A NETWORK UTILIZING A ROUTE SUMMARIZATION

CROSS-REFERENCE TO RELATED APPLICATIONS

This application is a continuation of U.S. application Ser. No. 17/342,899, filed on Jun. 9, 2021, which is expressly incorporated by reference herein in its entirety.

DESCRIPTION OF THE RELATED TECHNOLOGY

The present invention pertains to the signaling of unreachability of a network device(s), and more specifically, to the signaling of unreachability of a prefix in a network that utilizes route summarization.

BACKGROUND

In large-scale networks, the number of subnets and network addresses in routing tables increases too rapidly for routers to handle effectively. Route summarization (also called route aggregation or supernetting) reduces the number of entries in the routing table and creates one summary route that represents multiple networks and subnets, which can significantly reduce the load on the router and network overhead. However, when route summarization is enabled, a fast-convergence mechanism such as BGP Prefix-Independent Convergence (PIC) Edge becomes unavailable. For example, if one of network devices in a network that utilizes route summarization fails, other network devices that are in remote areas or domains must wait for Border Gateway Protocol (BGP) to figure out the unreachability of the failed network device to trigger per-prefix convergence, which is slow.

DETAILED DESCRIPTION

Figure 1:
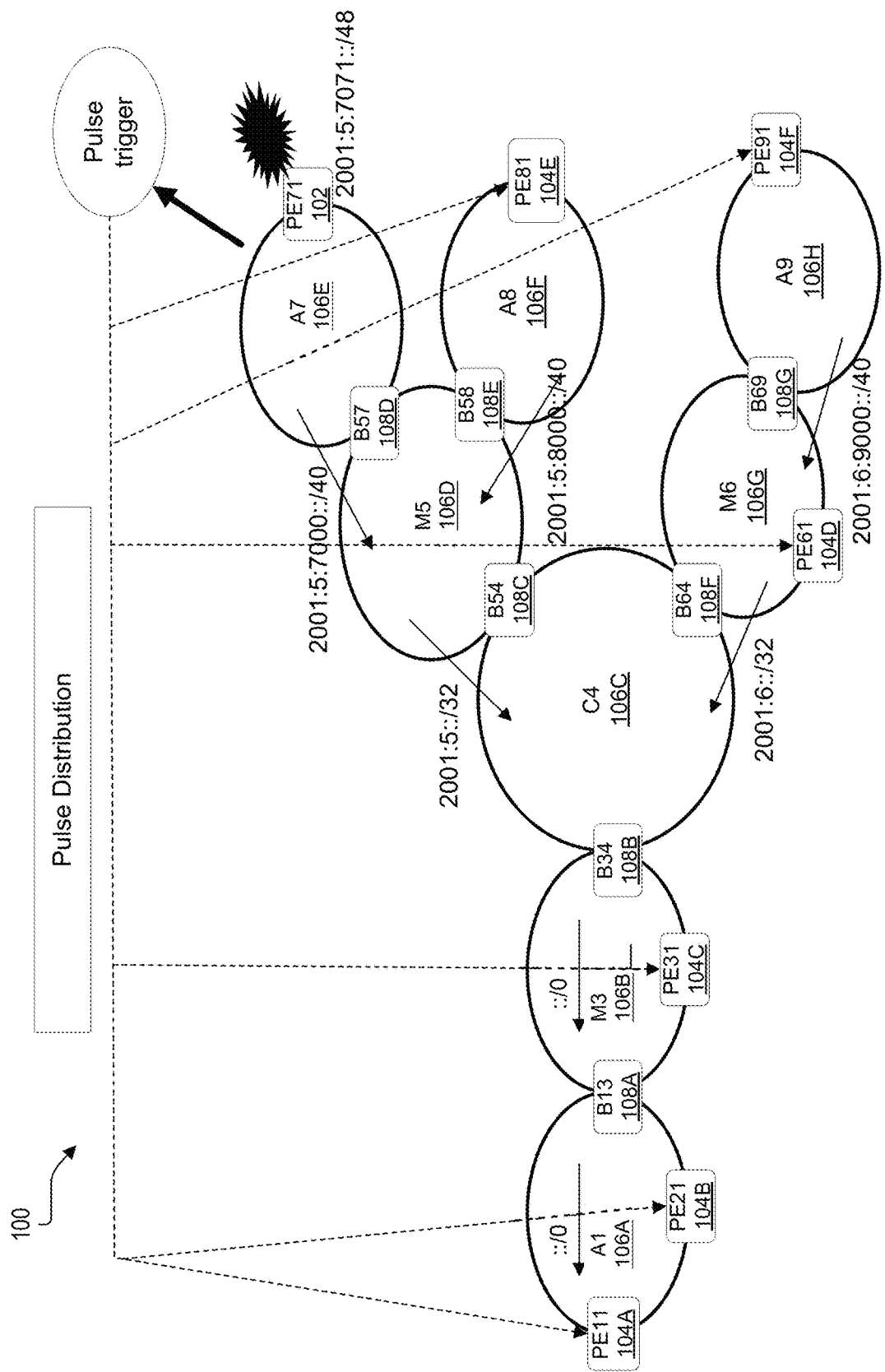
FIG. 1 illustrates an example diagram of a network architecture for signaling the unreachability of a network device according to one or more examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

In large-scale networks, the number of subnets and network addresses in routing tables increases too rapidly for routers to handle effectively. Route summarization (also called route aggregation or supernetting) reduces the number of entries in the routing table and creates one summary route that represents multiple networks and subnets, which can significantly reduce the load on the router and network overhead. However, when route summarization is enabled, a fast-convergence mechanism such as BGP PIC Edge becomes unavailable. For example, if one of the network devices in a network that utilizes route summarization fails, other network devices that are in remote domains must wait for BGP to figure out the unreachability of the failed network device to trigger per-prefix convergence, which is slow.

One solution is to use the availability of a routing path to figure out the reachability of a remote device. However, in a multi-domain network where route summarization is in place, this method works only within a specific domain. The route summarization hides each device and its locator behind the summarization and therefore, the unreachability of a particular device cannot be assessed. Another solution is to use probes that are targeted to an IP address of a remote device. However, this solution cannot scale with large networks and cannot always fulfill the fast detection of unreachability.

Therefore, there exists a need for signaling a failure or unreachability of a network device or a prefix of the network device to other network devices in remote areas or domains in a network that utilizes route summarization. There is also a strong need for signaling the unreachability of the prefix that can scale out with large-scale networks and enable fast convergence.

The present technology includes systems, methods, and computer-readable media for solving these problems and discrepancies. Specifically, systems, methods, and computer-readable media for signaling the unreachability of a network device or a prefix of the network device in a network that utilizes route summarization are provided in the present disclosure.

Overview

Methods, systems, and non-transitory computer-readable media are provided for signaling the unreachability of a network device(s) or a prefix of the network device in a network utilizing route summarization.

The present technology can detect the unreachability of at least one Provider Edge (PE) device in a network domain of a network and determining that route summarization is being used within the network where the unreachability of at least one PE device is hidden by the route summarization. The present technology can further transmit a failure message informing other PE devices of the unreachability of at least one PE device.

The failure message can be a negative pulse message, which can rapidly expire shortly after the failure message is transmitted to the other PE devices. A pulse is a short message, which has a very limited life time, i.e., it can be rapidly populated across the network and leave no state. The negative pulse message is ephemeral, meaning it transmits the information and is not stored. In some embodiments, the negative pulse message may cause an action taken by the receiving device.

Detecting the unreachability of at least one PE device can include receiving data from an Interior Gateway Protocol (IGP) within the network domain.

In some examples, when determining that the route summarization is being used within the network, the present technology can analyze routing data from various domains to detect area border routing (ABR) and summary generation. In another example, when determining that route summarization is being used within the network, the present technology can perform analyzing ABR configuration data.

The failure message can inform the other PE devices about the unreachability of a fine grain prefix of at least one PE device that is part of a summary route. The other PE devices can be determined based on at least one of a specific prefix or a set of prefixes belonging to an aggregate.

The transmitting of the failure message can be part of a link-state protocol. Also, the mechanism for transmitting the failure message can be based on various types of network architectures such as a message queue associated with a particular topic, a publisher-subscriber pattern, or a distributed in-memory data storage.

Furthermore, the present technology can transmit the failure message about the unreachability of at least one PE device to a pulse distribution agent where the pulse distribution agent is configured to transmit the failure message to one or more PE devices connected to the pulse distribution agent.

Additionally, the present technology can generate a distribution structure to determine the other PE devices to transmit the failure message. For example, the distribution structure can be a statically configured distribution tree based on a receiver list and a sender list. In another example, the distribution structure can be an automated loop-free distribution structure based on a service discovery protocol and predetermined propagation rules. In another example, the distribution structure can be a non-organized structure configured to add an attribute within the failure message when the failure message is transmitted to the other PE devices.

A system for signaling unreachability of a network device in a network that utilizes route summarization can include one or more processors and at least one computer-readable storage medium storing instructions which, when executed by the one or more processors, cause the one or more processors to detect an unreachability of at least one PE device in a network domain of a network, determine that a route summarization is being used within the network where the unreachability of the at least one PE device is hidden by the route summarization, and transmit a failure message informing other PE devices of the unreachability of the at least one PE device.

A non-transitory computer-readable storage medium having stored therein instructions which, when executed by one or more processors, can cause the one or more processors to detect an unreachability of at least one PE device in a network domain of a network, determine that a route summarization is being used within the network where the unreachability of the at least one PE device is hidden by the route summarization, and transmit a failure message informing other PE devices of the unreachability of the at least one PE device.

DESCRIPTION

The disclosed technology addresses the need in the art for signaling unreachability of a prefix of a network device(s) in a network that utilizes route summarization. The present technology involves systems, methods, and computer-readable media for detecting that at least one network device is unreachable in a network that utilizes route summarization and signaling the unreachability to other devices in the network.

FIG. 1 illustrates an example diagram of a network architecture 100 for signaling the unreachability of a network device according to one or more examples of the present disclosure. The network architecture 100 comprises Provider Edge (PE) device 102 that becomes unreachable and other PE devices 104A-F (collectively, 104) within network domains 106A-H (collectively, 106) where branches 108A-G (collectively, 108) link various pairs of network domains 106. Route summarization can be enabled in the network architecture 100 where each branch 108 (e.g., router) generates a summary route. For example, branch 106E has a summary route of 2001:5:7000::/40, and branch 106F has a summary route of 2001:5:8000::/40.

When PE device 102 fails (i.e., becomes unreachable) and locator 2001:5:7011::/48 of PE device 102 becomes unreachable, a pulse message including information about the unreachability of PE device 102 and its locator 2001:5:7011::/48 can be triggered. Then, the pulse message can be distributed to other PE devices 104.

Although the network architecture 100 includes network domains 106, network areas or a combination of network areas and domains can be alternatively used.

Furthermore, for exemplary purposes, the present disclosure is discussed in the context of an Internet Protocol Version 6 (IPv6) address. However, the present technology is also applicable in other versions of an IP address, for example, but not limited to, IPv4.

Figure 2:
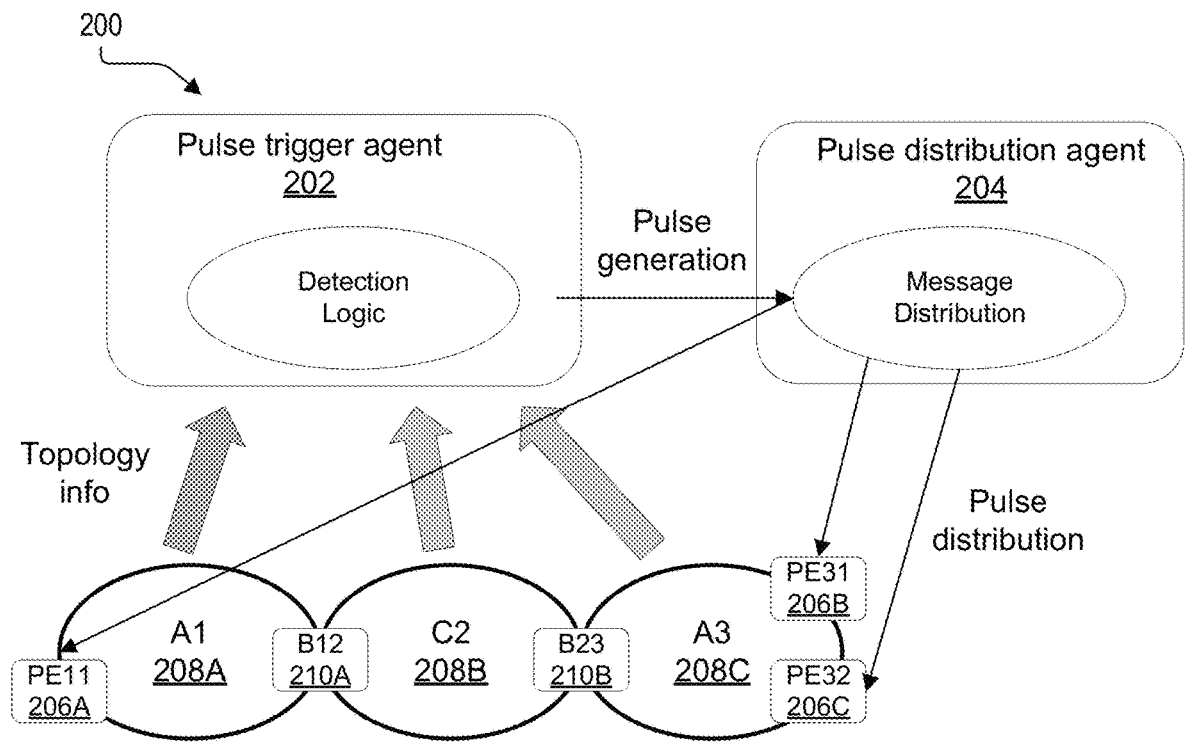
FIG. 2 illustrates an example diagram of a network architecture including a pulse trigger agent and a pulse distribution agent according to one or more examples of the present disclosure.

FIG. 2 illustrates an example diagram of a network architecture 200 including a pulse trigger agent 202 and a pulse distribution agent 204 according to one or more examples of the present disclosure. The network architecture 200 further comprises one or more PE devices 206A-C (collectively, 206) within network domains 208A-C (collectively, 208) where branch 210A links network domains 208A and 208B and branch 210B links network domains 208B and 208C.

In some embodiments, pulse trigger agent 202 can detect the presence of route summarization. The detection of the route summarization can be done by various methods. For example, pulse trigger agent 202 can analyze routing data from various network areas or domains (e.g., network domains 208). Based on the routing data, pulse trigger agent 202 can detect Area Border Router (ABR), which summarizes routes and sends summary link advertisements to describe the routes to other areas and/or domains. As such, pulse trigger agent 202 can detect the presence of route summarization in network 200 by analyzing the routing data and detecting the ABR. In another example, pulse trigger agent 202 can detect the presence of route summarization in network 200 by analyzing ABR configuration.

In some implementations, pulse trigger agent 202 can receive and collect information about the reachability or unreachability of prefixes that are components of the summary routes in each area and/or domain. Also, pulse trigger agent 202 can detect the unreachability in a timely manner, for example, by getting data from the existing Interior Gateway Protocol (IGP), which is used for exchanging routing information between gateways (e.g., routers) within a network system.

Furthermore, pulse trigger agent 202 can generate a negative pulse message about the unreachability of a prefix to transmit to pulse distribution agent 204. When at least one of PE devices 206 fails, or a prefix of at least one of PE devices 206, which is one of the components of the summary routes, becomes unreachable in its source area or domain, pulse trigger agent 202 can generate a negative pulse message and transmit the negative pulse message to pulse distribution agent 204. In some examples, the negative pulse message can be generated by utilizing existing link-state routing (LS) protocols running on the Area Border Router (ABR)/Autonomous System Border Router (ASBR). In another example, the unreachability can be assessed by existing graph algorithms when leveraging the external source of information.

In network 100 in FIG. 1, as an example, pulse trigger agent 202, based on topology information, can detect that a router (e.g., branch 108D) is generating a summary route, 2001:5:7000/40. Pulse trigger agent 202 can also detect that the summary route 2001:5:7000/40 includes a fine grain advertisement 2001:5:7071::/48 from PE device 102 and determine that route summarization is utilized in the network 100. When PE device 102 fails or the fine-grain advertisement 2001:5:7071::/48 becomes unreachable, pulse trigger agent 202 can generate a negative pulse message informing of the unreachability to pulse distribution agent 204.

Furthermore, pulse trigger agent 202 can differentiate the unreachability of a prefix or a set of prefixes from a partitioning of a routing domain (e.g., network domain 208) since pulse trigger agent 202 can monitor reachability to the ABR nodes, which advertise a summary route. If pulse trigger agent 202 detects a simultaneous loss of reachability for one of the prefixes that pulse trigger agent 202 is monitoring and at least one ABR node, pulse trigger agent 202 can identify that the routing domain is partitioned and does not generate a pulse message.

In some embodiments, pulse distribution agent 204 can receive one or more negative pulse messages from pulse trigger agent 202. Furthermore, pulse distribution agent 204 can inform the messages to PE devices 206 in network 200 of the unreachability based on the negative pulse messages. In some examples, a format or protocol of the negative pulse messages from pulse trigger agent 202 to pulse distribution agent 204 can be different than the one from pulse distribution agent 204 to PE devices 206 in network 200.

In network 200 where only one pulse distribution agent 204 is deployed, pulse distribution agent 204 can propagate the negative pulse message to all or a subset of the PE devices 206 in network 200.

Although a single pulse trigger agent and a single pulse distribution agent are described in FIG. 2, multiple pulse trigger agents and multiple pulse distribution agents can be deployed. From a deployment perspective, multiple pulse trigger agents and multiple pulse distribution agents can be deployed not only for redundancy reasons but also to limit the domain responsibility of each agent. An example network architecture where multiple pulse trigger agents are deployed is described below with respect to FIG. 3.

Furthermore, the present disclosure is not limited to a particular deployment of a pulse trigger agent and/or a pulse distribution agent. The method for signaling unreachability of a network device or a prefix can be implemented in different embodiments such as existing LS protocols, additional code/components within the router operating systems, a container running on the route processor (RP) of a network device, or a container/virtual machine running on a server located in a domain controller.

Figure 3:
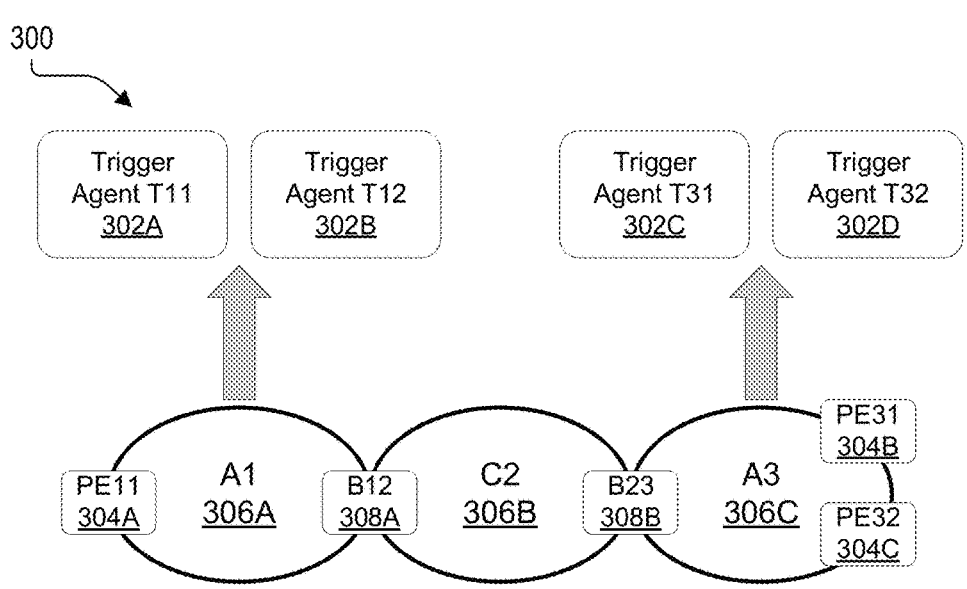
FIG. 3 illustrates an example diagram of a network architecture where multiple pulse trigger agents are deployed according to one or more examples of the present disclosure.

FIG. 3 illustrates an example diagram of a network architecture 300 where multiple pulse trigger agents 302A-D are deployed according to one or more examples of the present disclosure. The network architecture 300 comprises multiple trigger agents 302A-D, multiple PE devices 304A-C, network domains 306A-C, and branches 308A and 308B.

Network domain 306A has two pulse trigger agents 302A and 302B, which are responsible for generating a pulse message when any one of the prefixes in network domain 306A becomes unreachable. Similarly, pulse trigger agents 302C and 302D are responsible for generating a pulse message when any one of the prefixes in network 306C becomes unreachable.

Figure 4:
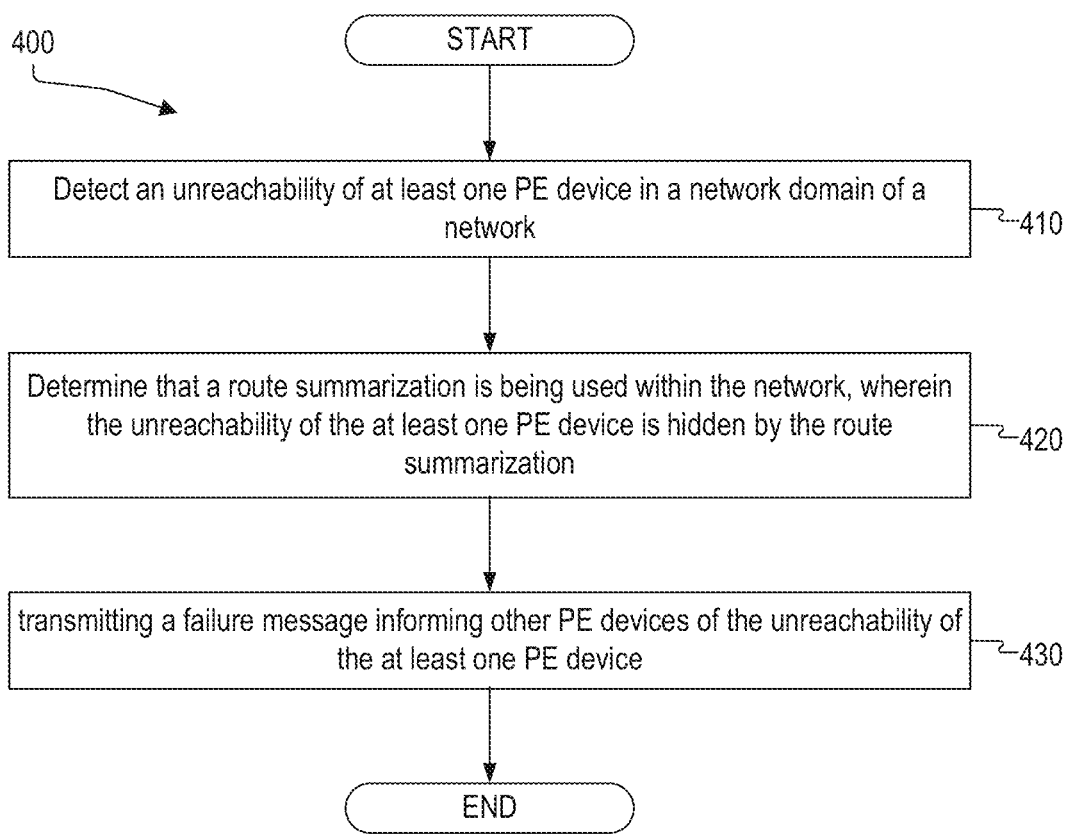
FIG. 4 is a flowchart of a method for signaling unreachability of a network device in a network that utilizes route summarization according to an example of the present disclosure.

FIG. 4 illustrates an example method 400 for signaling the unreachability of a network device in a network that utilizes route summarization according to an example of the present disclosure. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

According to some embodiments, the method includes detecting an unreachability of at least one PE device in a network domain of a network at step 410. For example, the pulse trigger agent 202 illustrated in FIG. 2 may detect an unreachability of at least one PE device in a network domain of a network. In some embodiments, detecting the unreachability of at least one PE device includes receiving data from an IGP within the network domain. For example, the pulse trigger agent 202 illustrated in FIG. 2 may detect the unreachability of at least one PE device based on data from an IGP. Moreover, there can be various ways to receive data from the IGP within the network domain in detecting the unreachability of the at least one PE device. For example, pulse trigger agent 202 can receive data directly from the IGP. In another example, there can be an intermediate protocol or component between pulse trigger agent 202 and the IGP. In some examples, IGP information on a router can be transmitted via Boarder Gateway Protocol-Link State (BGP-LS) to pulse trigger agent 202. Or, the data from the IGP can be transmitted to pulse trigger agent 202 by utilizing telemetry.

According to some embodiments, the method includes determining that route summarization is being used within the network at step 420. For example, the pulse trigger agent 202 illustrated in FIG. 2 may determine that a route summarization is being used within network 200.

In some embodiments, in determining that the route summarization is being used within the network at step 420, the pulse trigger agent can analyze routing data from various domains to detect ABR and summary generation. In another example, to determine that the route summarization is being used within the network at step 420, the pulse trigger agent can analyze ABR configuration data.

According to some embodiments, the method includes transmitting a failure message informing other PE devices of the unreachability of at least one PE device at step 430. For example, the pulse distribution agent 204 illustrated in FIG. 2 may transmit a failure message informing other PE devices of the unreachability of at least one PE device.

In some embodiments, transmitting the failure message at step 420 can be part of a link-state (LS) protocol. For example, existing LS protocols can be extended to propagate the failure message, which can be a negative pulse message. LS protocols generally use characteristics of a route to determine the best path. A new flooding (i.e., propagation) scope(s) for the negative pulse message can be defined for protocols such as Open Shortest Path First (OSPF) and Intermediate System to Intermediate System (ISIS) that belong to the same link state routing protocol family. Also, LS protocols for each pulse flooding scope can be kept in a scope-specific Link State Database (LSDB). A type of process underlying the protocols can include flooding (i.e., propagation), optionally processing, or discarding the negative pulse message.

Furthermore, the propagation of the negative pulse message does not result in any incoming link-state data processing. The pulse advertisement is not mixed with the link-state advertisement in a single protocol message, which could cause the processing of the link-state data in the same message. New protocol data units (PDUs) can be defined to avoid mixing the negative pulse messages (e.g., events) with the topological and reachability information that are treated as states in the routing protocols. For example, in IS-IS, a Flooding Scoped Pulse Link State PDU (FS-Pulse-LSP) and a Flooding Scoped Pulse Partial Sequence Number PDU (FS-Pulse-PSNP) can be defined.

In some embodiments, pulse LS protocols can be propagated (i.e., flooded) with logic analogous to one used by LS protocols when flooding state information. However, the flooding of the negative pulse messages can cease after configurable numbers of retries.

According to some embodiments, the method further includes generating a distribution structure to determine the other PE devices to transmit the failure message. For example, the pulse distribution agent 204 illustrated in FIG. 2 may generate a distribution structure to determine the other PE devices to transmit the failure message. Some examples of the distribution structure can include a statically configured distribution tree, automated loop-free distribution tree topology, or non-organized structure with loop prevention. More details on the examples of the distribution structure are described below with respect to FIGS. 9-11.

In some embodiments, the failure message can be a negative pulse message that rapidly expires after the failure message is transmitted to the other PE devices. A pulse is a short message with a limited lifetime. The pulse can be rapidly populated across the network and leave no state. For example, the negative pulse message has a limited lifetime and might be stored in a buffer or cache long enough to be interpreted by the receiving device. In contrast to a regular state, which remains in a network for a prolonged period of time, a negative pulse is an event that is short-lived. In some embodiments, the negative pulse may result in an action taken by the receiving device. An exemplary event is described with respect to the negative pulse in this present disclosure. A negative pulse can be used to signal a variety of events that are transient as long as the signal does not result in a persistent state.

The negative pulse message can be propagated (i.e., flooded) and optionally processed by some of the other PE devices. Also, there is no flushing or purging mechanism for the negative pulse message. The negative pulse message can be automatically destroyed after the message is flooded and used. If the negative pulse message is not used locally on a router, it is destroyed after it is propagated. For example, pulse LS protocols can be retained for a short period of time (e.g., 60 seconds) to prevent reprocessing the same PDU twice.

In some embodiments, the negative pulse mechanism can inform other PE devices about the unreachability of a fine grain device or prefix, which is hidden behind the summary in a remote area and/or domain.

Figures 5A, 5B:
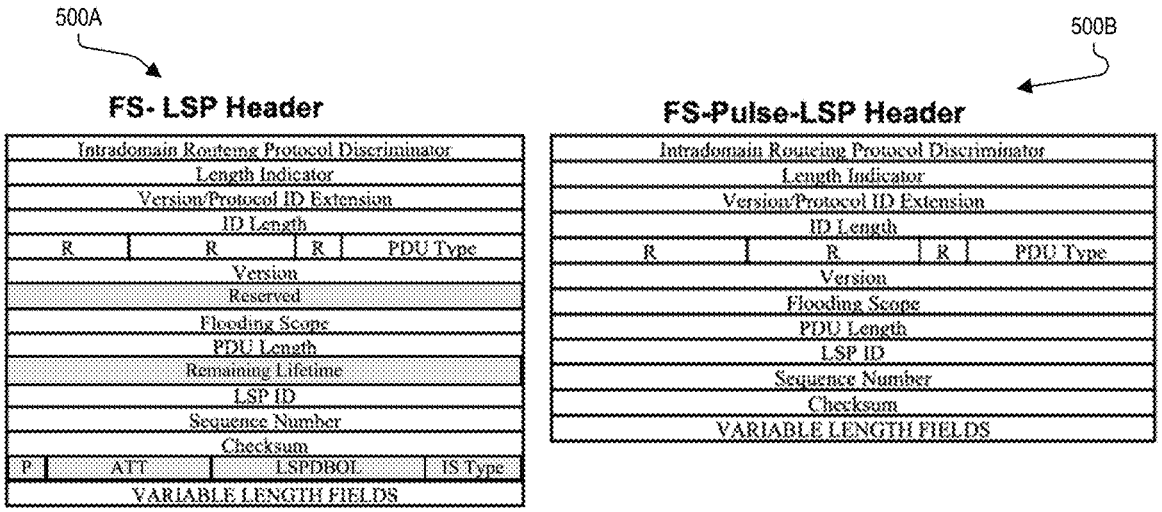
FIGS. 5A and 5B illustrate example packet header formats.

FIGS. 5A and 5B illustrate example IS-IS packet header formats 500A and 500B. For example, the header format 500A is taken from RFC 7356. FIGS. 5A and 5B describe differences between an existing IS-IS FS-LSP header 500A used to send stateful information and an example revised format for the header of a new IS-IS FS-Pulse-LSP 500B, which could be used to send pulse information. FIG. 5B is only an exemplary implementation and other various implementations can be utilized for sending a pulse. Some fields in the FS-LSP header 500A, for example, "reserved" and "remaining lifetime," can be removed in the new FS-Pulse-LSP header 500B as they are not applicable. Most noteworthy difference is the removal of "remaining lifetime" as shown in FIG. 5B. Since FS-Pulse-LSPs can be used to signal a short-lived event and need not be stored on non-ephemeral storage, the "remaining lifetime" field is not required.

Figure 6:
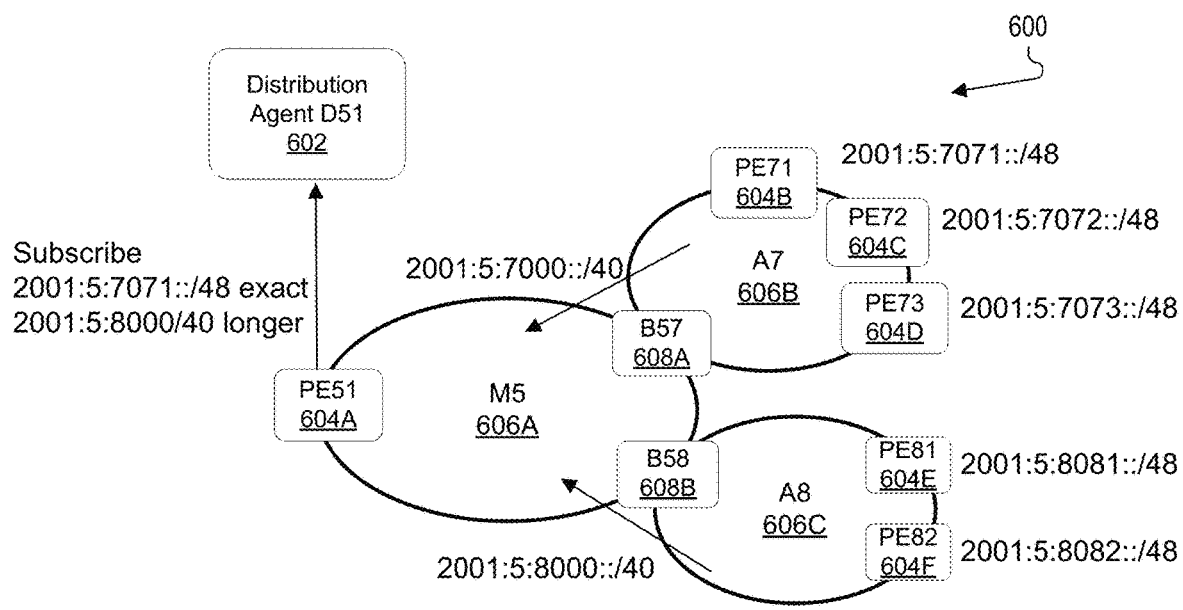
FIG. 6 illustrates an example diagram of a network architecture including a distribution agent according to one or more examples of the present disclosure.

FIG. 6 illustrates an example diagram of a network architecture 600 including a distribution agent 602 according to one or more examples of the present disclosure. In a large network constituted by numerous network devices, it can be unlikely to have a single PE device that can communicate with all other PE devices. To save resources in the distribution layer and on the receiving PE device side, PE devices can signal their interest to receive pulses only for a subset of remote destinations. As illustrated in FIG. 6, in some embodiments, PE device 604A can have a subscription that may be based on a specific prefix (exact match) (e.g., 2001:5:7071::/48 in FIG. 6) or a set of prefixes belonging to an aggregate (longest match) (e.g., 2001:5:8000/40 in FIG. 6). Subscriptions may be propagated or aggregated by pulse distribution agent 602.

Various types of network architectures are available for facilitating a transmission of a negative pulse message as described below.

Figure 7:
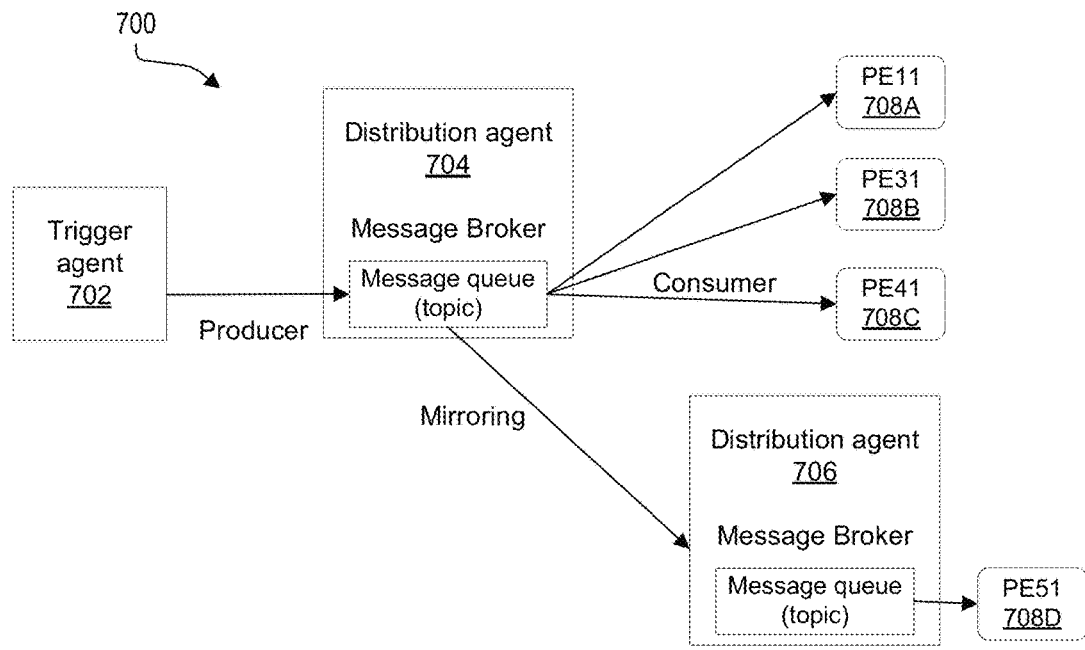
FIG. 7 illustrates an example diagram of a network architecture for transmitting a message to network devices according to one or more examples of the present disclosure.

FIG. 7 illustrates an example diagram of a network architecture 700 where a negative pulse message can be transmitted based on a message queue associated with a particular topic. The network architecture 700 comprises pulse trigger agent 702, pulse distribution agents 704 and 706, and PE devices 708A-D (collectively, 708). The basic architecture of a message queue includes a producer(s) (e.g., pulse trigger agent 702) that creates messages and delivers them to the message queue and a consumer(s) (e.g., PE devices 708) that connects to the queue and receives the messages. Also, the messages published to the message queue can be replicated and mirrored to another message queue. In the network architecture 700, pulse trigger agent 702 can publish a message into a message queue associated with a particular topic within pulse distribution agent 704. PE devices 708 or other pulse distribution agent 706 can read the message from the message queue. The message is an ephemeral message that does not need any storage on disk.

Figure 8:
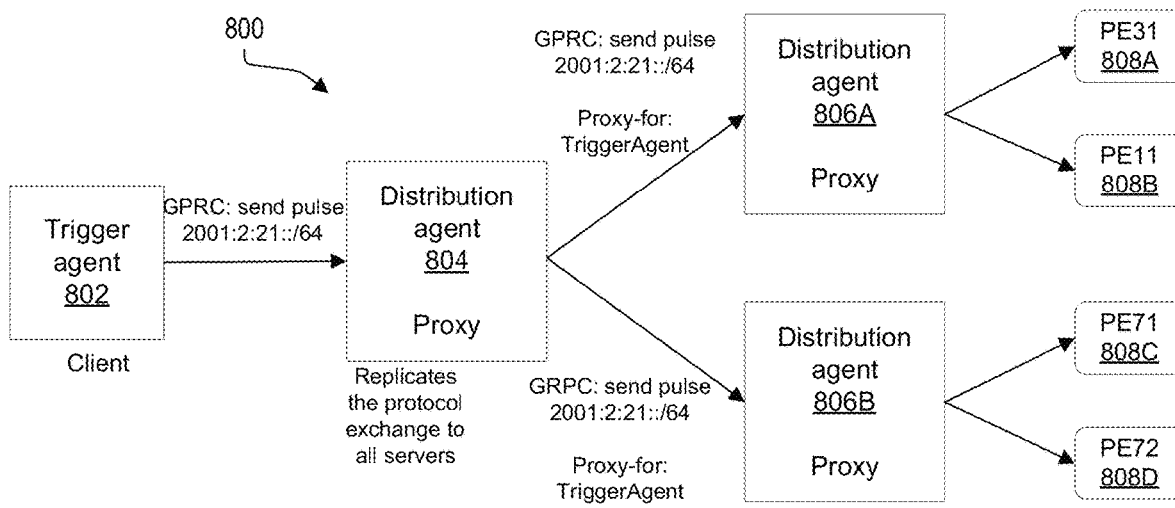
FIG. 8 illustrates another example diagram of a network architecture transmitting a message to network devices according to one or more examples of the present disclosure.

FIG. 8 illustrates an example diagram of a network architecture 800 where transmitting the failure message can be performed via a message broadcast. The network architecture 800 comprises pulse trigger agent 802, pulse distribution agents 804, 806A, and 806B, and PE devices 808A-D. When pulse distribution agent 804 receives a message from pulse trigger agent 802, pulse distribution agent 804 can replicate or mirror the message to other distribution agents (e.g., pulse distribution agents 806A and 806B) that are connected to pulse distribution agent 804.

In some embodiments, a negative pulse message can be transmitted based on a publisher-subscriber pattern. In the publisher-subscriber pattern, any negative pulse message published by senders (i.e., publishers) can be, without a message broker, directly delivered to specific receivers (i.e., subscribers) that subscribe to the message.

In some embodiments, a negative pulse message can be transmitted based on a distributed in-memory database between pulse trigger agents and pulse distribution agents.

Scale-out approaches can be used for the pulse distribution agent both for scaling and redundancy. When multiple pulse distribution agents are deployed, it is important to ensure that the messages are not looping within the distribution layer. A distribution structure to determine PE devices to transmit the negative pulse message without any looping can be generated in various embodiments as described below.

Figure 9A:
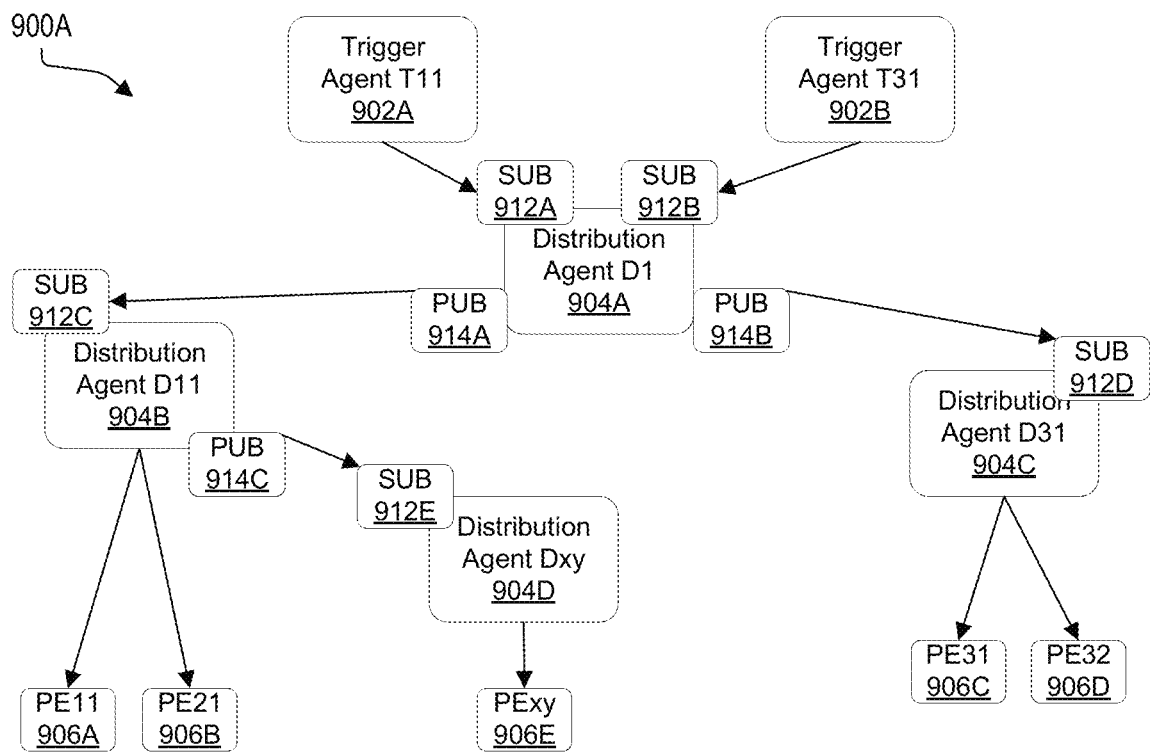
FIGS. 9A and 9B illustrate example diagrams of a statically configured distribution tree according to one or more examples of the present disclosure.
Figure 9B:
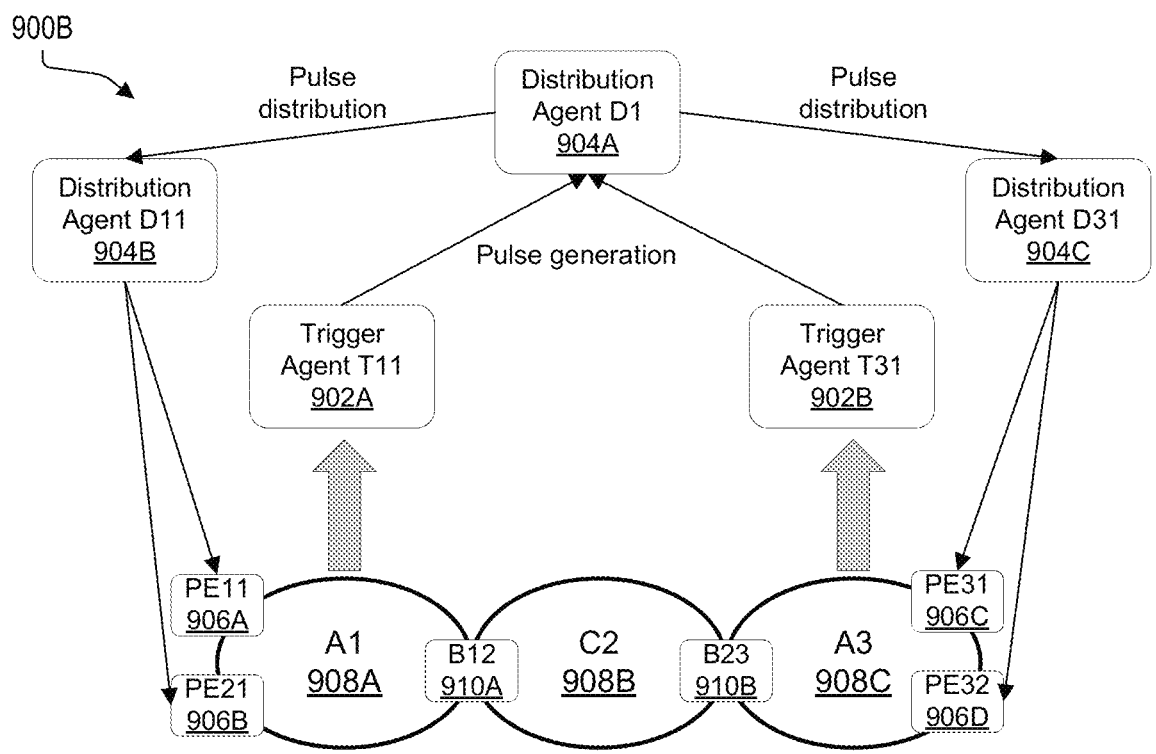

FIG. 9A illustrates an example diagram of a statically configured distribution tree 900A for a network architecture 900B in FIG. 9B. The distribution tree 900A comprises pulse trigger agents 902A and 902B, pulse distribution agents 904A-D, PE devices 906A-E, subscribers 912A-E, and publishers 914A-C. When building statistically configured distribution tree 900A, each distribution agent 904A-D can be configured with one or more parameters such as a receiver list and a sender list. For example, the receiver list can include agents or devices that receive messages from senders (e.g., publishers). The sender list can include agents or devices that will send messages to receivers (e.g., subscribers).

Figure 10A:
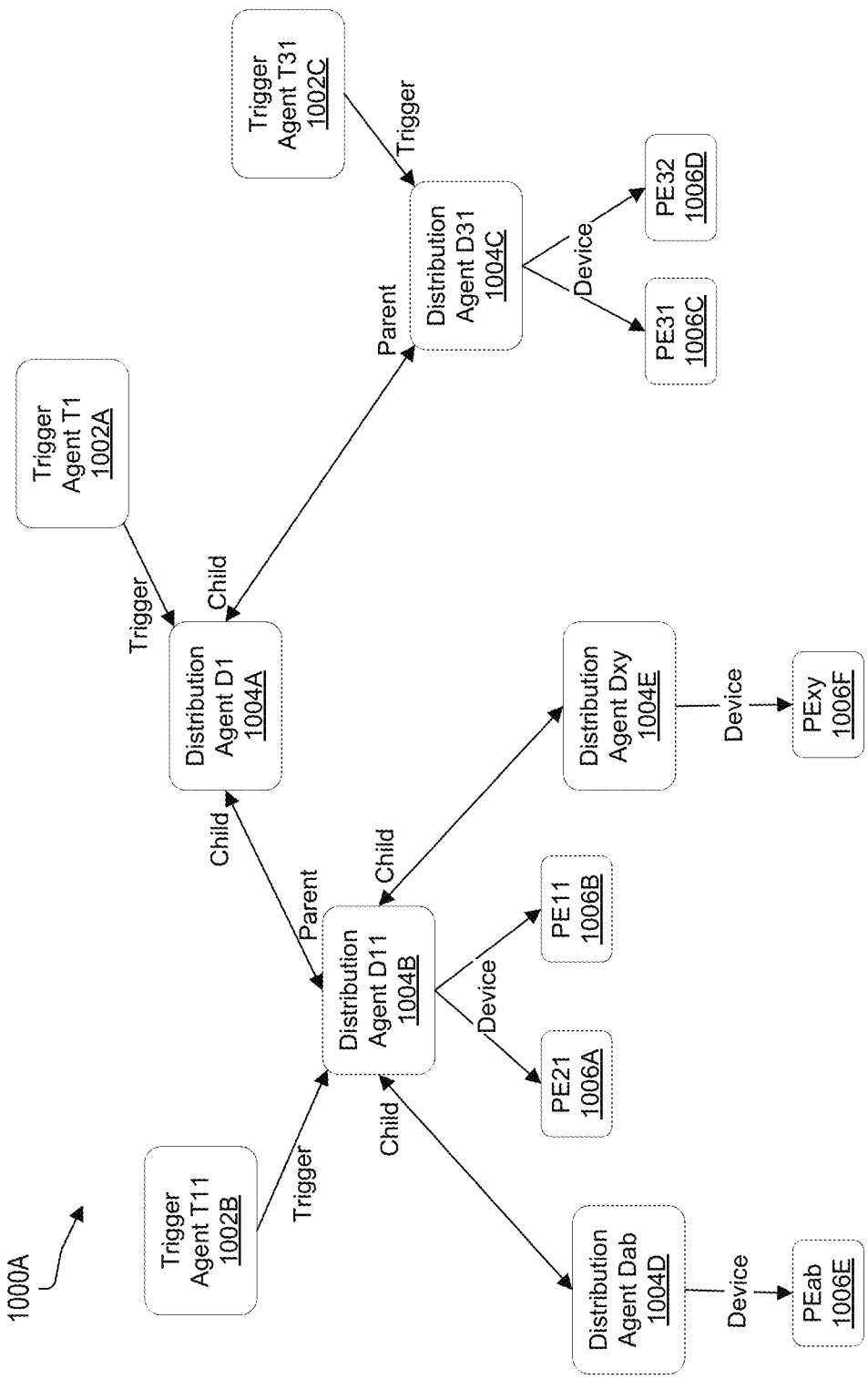
FIGS. 10A-10D illustrate example diagrams of an automated loop-free distribution structure according to one or more examples of the present disclosure.
Figure 10D:
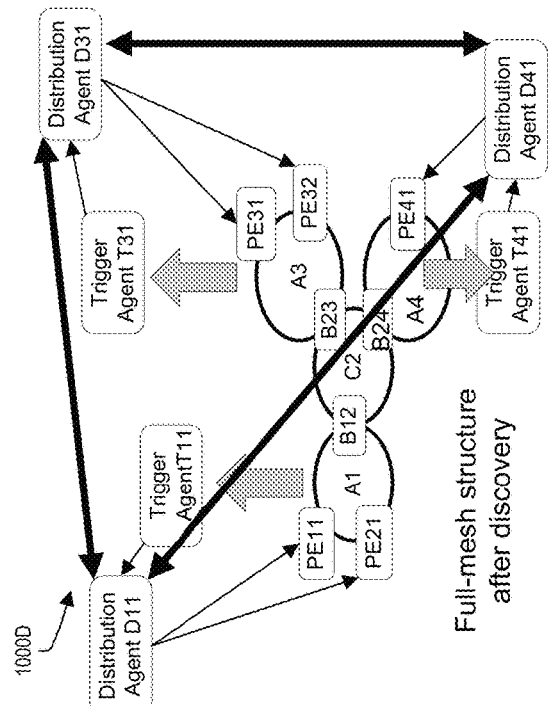
Figure 10B:
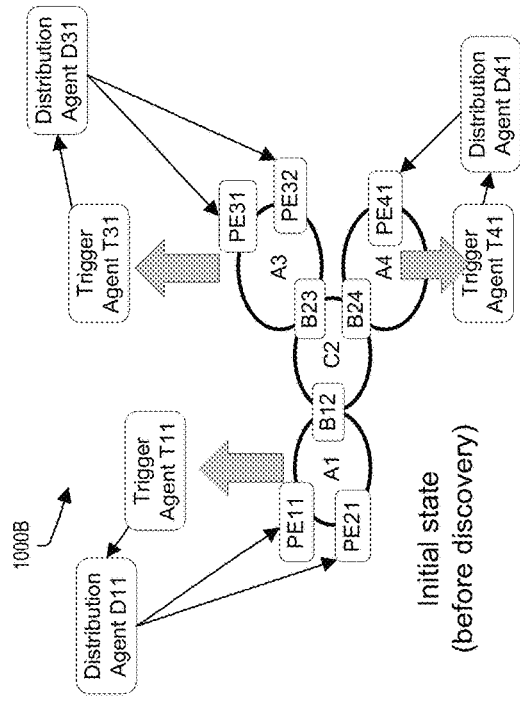
Figure 10C:
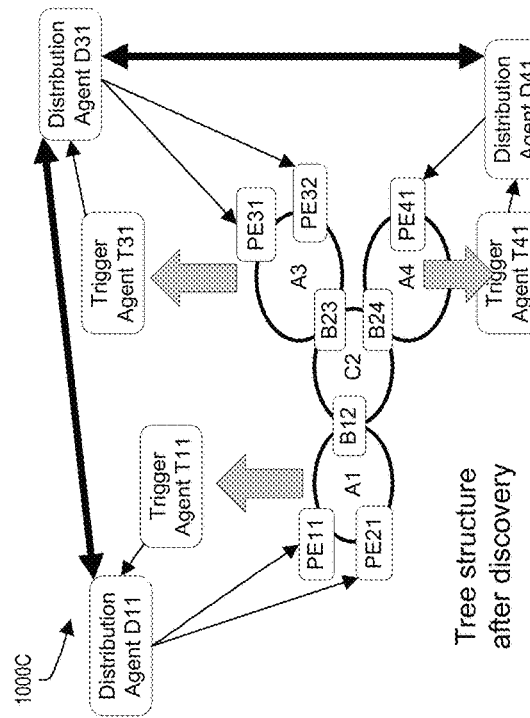

FIG. 10A illustrates an example diagram of an automated loop-free distribution structure 1000A based on a service discovery protocol and predetermined propagation rules. Automated loop-free distribution structure 1000A comprises pulse trigger agents 1002A-C, pulse distribution agents 1004A-E, and PE devices 1006A-F. Automated loop-free distribution structure 100A does not have an initial organization or configuration of pulse distribution agents. Each pulse distribution agent 1004A-E has knowledge of PE devices 1006A-F that it is serving and pulse trigger agents 1002A-C that pulse distribution agent 1004A-E is connected. In some embodiments, based on a service discovery mechanism, pulse distribution agents 1004A-E can get knowledge of each other and may establish connections between each other to allow negative pulse messages to be propagated. For example, FIG. 10B illustrates a network structure 1000B in an initial state before the discovery mechanism is performed. FIGS. 10C and 10D illustrate a tree structure 1000C and a full-mesh structure 1000D, respectively, after the discovery mechanism is performed.

Depending on the type of structures (e.g., full-mesh, tree, etc.), appropriate propagation rules can be defined to avoid loops. For example, if the automated loop-free distribution structure 1000A is a tree as illustrated in FIG. 10A, each protocol socket can be associated with a type of parent, child, trigger, or device and the following rules can be defined. If a pulse distribution agent receives a pulse message from a trigger-type socket, the pulse distribution agent will propagate on every connection it has. If a distribution agent receives a pulse message from a parent socket, it will propagate only to devices and children. If a distribution agent receives a pulse message from a child socket, it will propagate to other children, all PE devices, and parents.

Figure 11A:
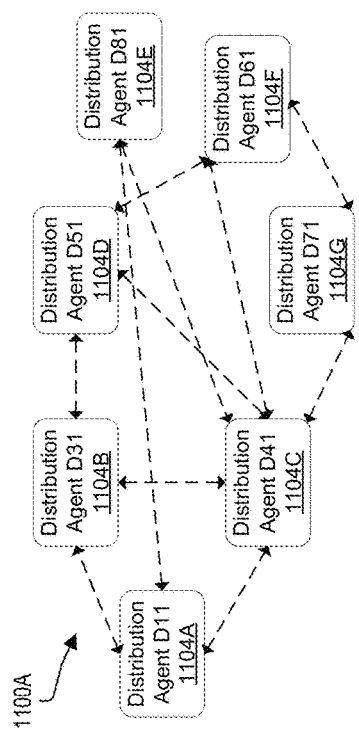
FIGS. 11A-11E illustrate example diagrams of a non-organized structure according to one or more examples of the present disclosure.

FIG. 11A illustrates an example diagram of a non-organized structure 1100A configured to add an attribute within the failure message when the failure message is transmitted to the other PE devices. The non-organized structure 1100A comprises pulse distribution agents 1104A-G. The non-organized mesh structure 1100A can be built automatically or statically, but the structure does not have to be loop-free by design. Loop prevention can be provided by adding information (e.g., identifier, attribute, etc.) within a negative pulse message when the message is propagated by pulse distribution agents 1104A-G. Existing routing protocols such as IS-IS, OSPF, or Border Gateway Protocol (BGP) can be implemented to facilitate the distribution of the negative pulse message(s).

Figure 11B:
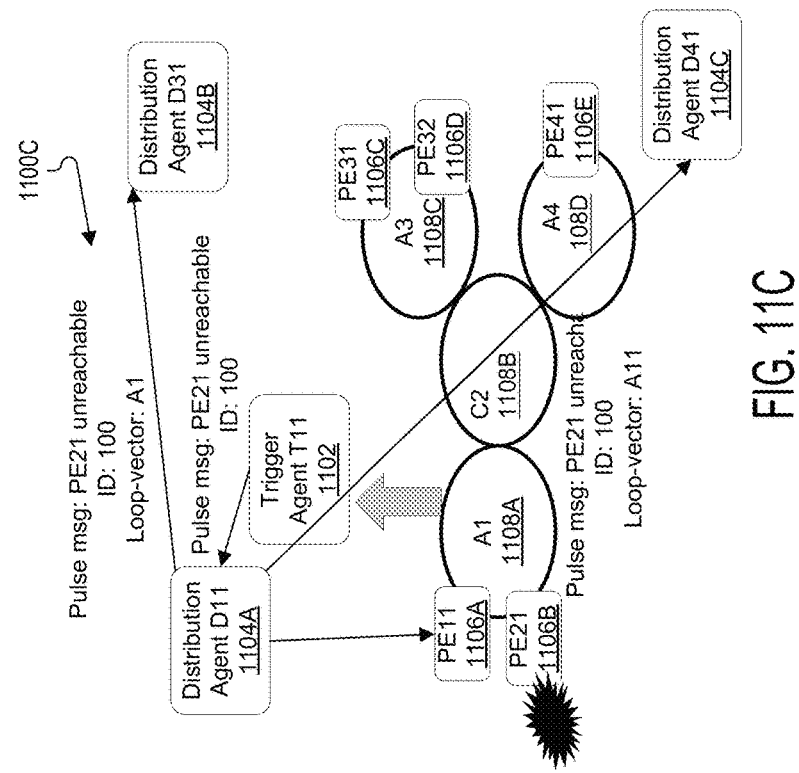

FIG. 11B illustrates an example non-organized structure 1100B that comprises trigger agent 1102, distribution agents 1104A-C, PE devices 1106A-E, and network domains 1108A-D. A full-mesh structure is created between distribution agents 1104A-C.

Figure 11C:
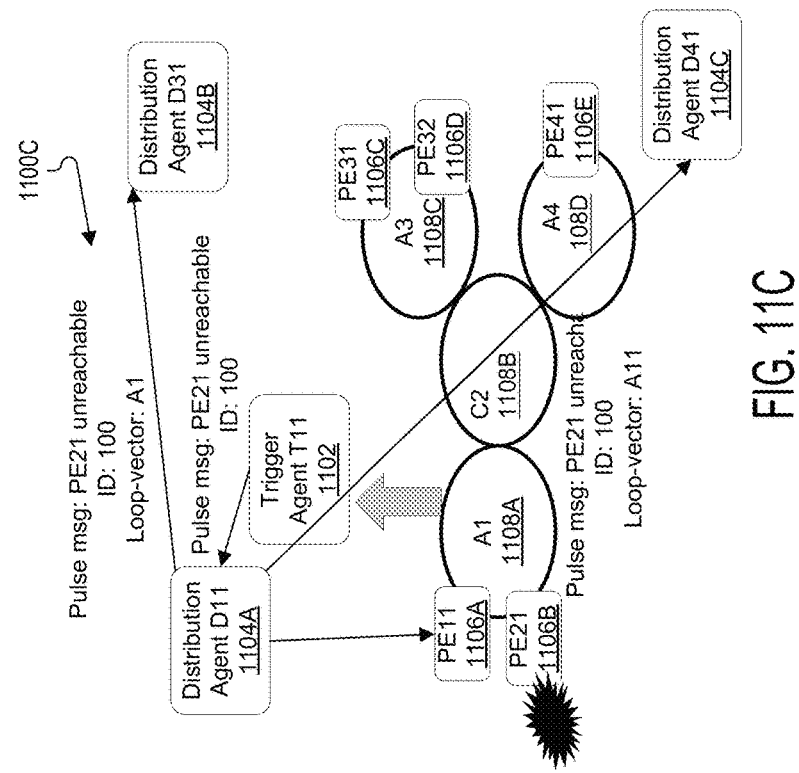

FIG. 11C illustrates an example non-organized structure 1100C where PE device 1106B becomes unreachable. Trigger agent 1102 generates a pulse message related to a failure of PE device 1106B to transmit to distribution agent 1104A. Distribution agent 1104A propagates the pulse message to local PE device 1106A and all the other distribution agents 1104B and 1104C that it knows based on static configuration or auto-discovery. When the pulse message is sent to another distribution agents 1104B and 1104C, distribution agent 1104A can add information in a loop avoidance vector to ensure that the pulse message does not go back to distribution agent 1104A or go back to any distribution agent in domain 1108A or in the same cluster that distribution agent 1104A belongs to. For example, an identifier (ID) can be used within the loop vector attribute of the pulse message when distribution agent 1104A sends the pulse message to other distribution agents 1104B and 1104C.

Figure 11D:
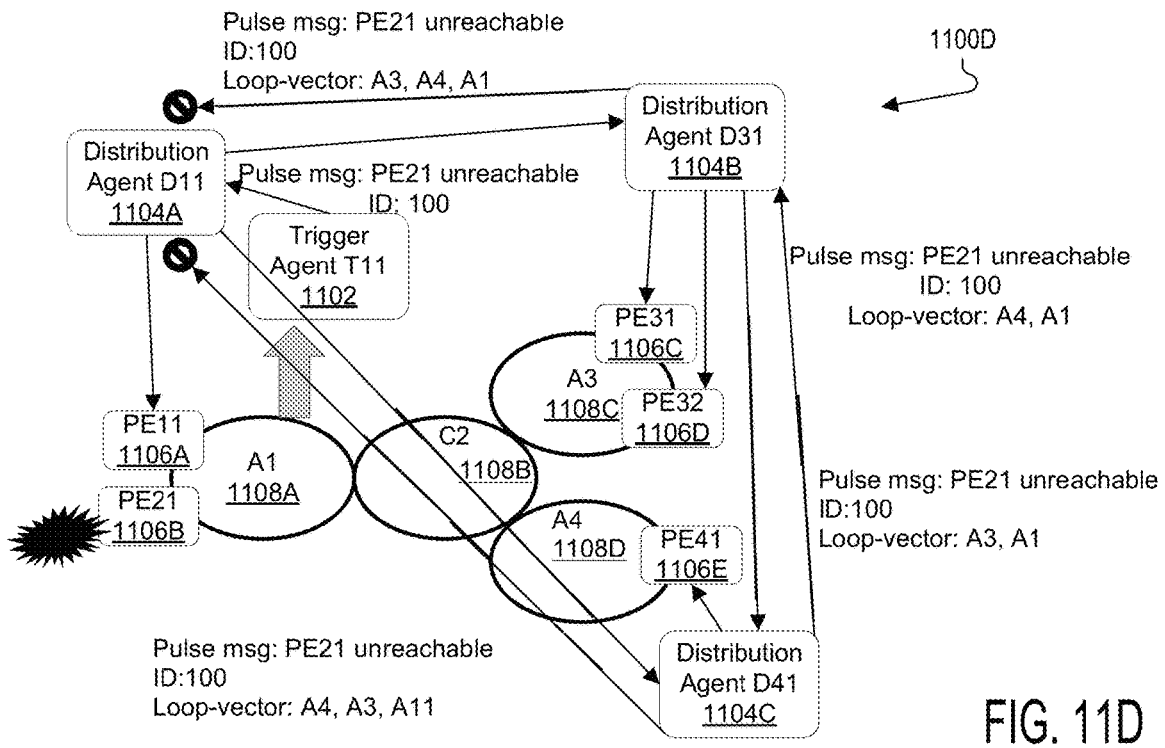

FIG. 11D illustrates an example non-organized structure 1100D where distribution agents 1104B and 1104C propagate the pulse message to devices or agents that they are connected to. For example, when distribution agents 1104B and 1104C receive the pulse message from distribution agent 1104A, they propagate the pulse message to their locally connected devices (e.g., PE devices 1106C and 1106D for distribution agent 1104B, PE device 1106E for distribution agent 1104C) and all other distribution agents (e.g., distribution agents 1104A-C). When the pulse message comes back to distribution agent 1104A, distribution agent 1104A can drop the pulse message because it can identify that the pulse message has looped.

Furthermore, the same pulse message can be received and processed more than once by the same distribution agent. For example, in FIG. 11D, distribution agent 1104B receives the pulse message from both distribution agents 1104A and 1104B. To build a loop-free distribution structure, information such as an attribute or an ID can be added to the pulse message. More details are described below with respect to FIG. 11E.

Figure 11E:
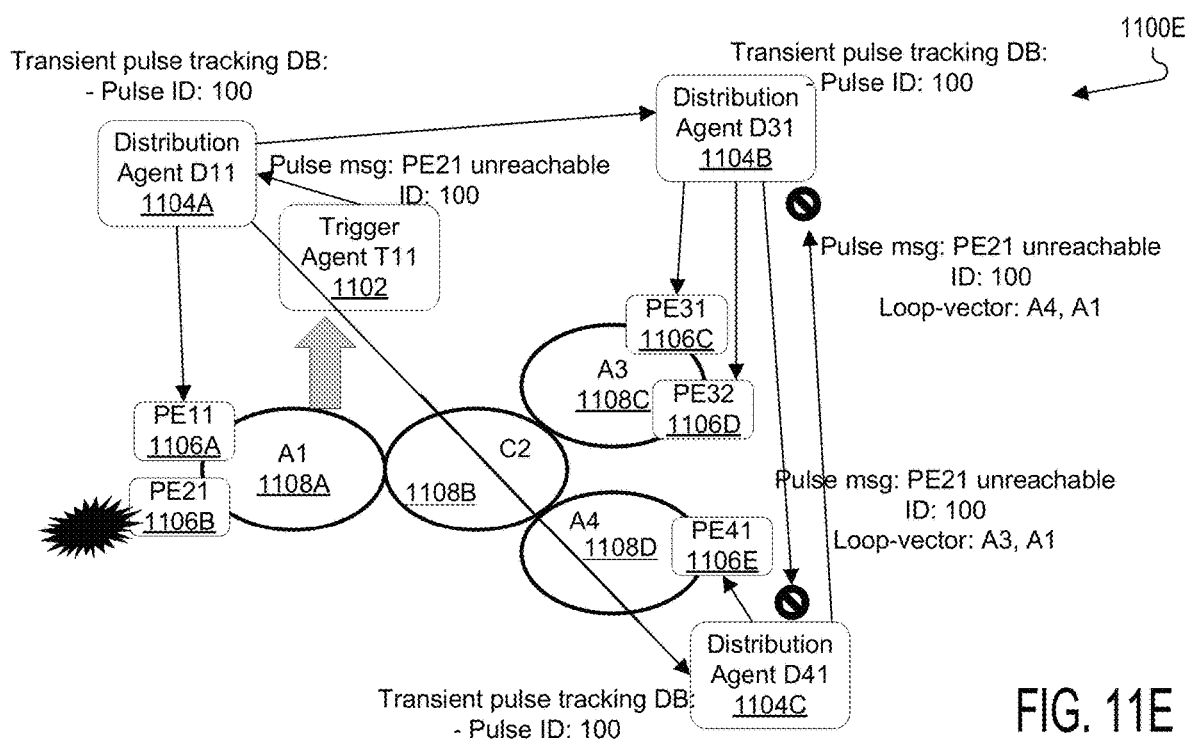

FIG. 11E illustrates an example non-organized structure 1100E where an ID is added to the pulse message to prevent any loop(s). The pulse message can be associated with an ID, which can be globally unique to ensure that distribution agents 1104A-C process the pulse message only once. For example, when distribution agent 1104B receives multiple pulse messages with the same pulse ID from distribution agents 1104A and 1104B, distribution agent 1104B can process only one of them and drop the rest. Although the pulse message is an event, not a state, each distribution agent 1104A-C can keep the memory of the pulse message, which has been already processed, for a very limited amount of time (e.g., a few seconds) to prevent reprocessing the already received and processed pulse message. As previously described with respect to FIG. 4, a negative pulse can be used to signal a variety of events that are transient as long as the signal does not result in a persistent state. Ephemeral storage (e.g., volatile temporary storage) can be alternatively used instead of using the loop vector.

Figure 12:
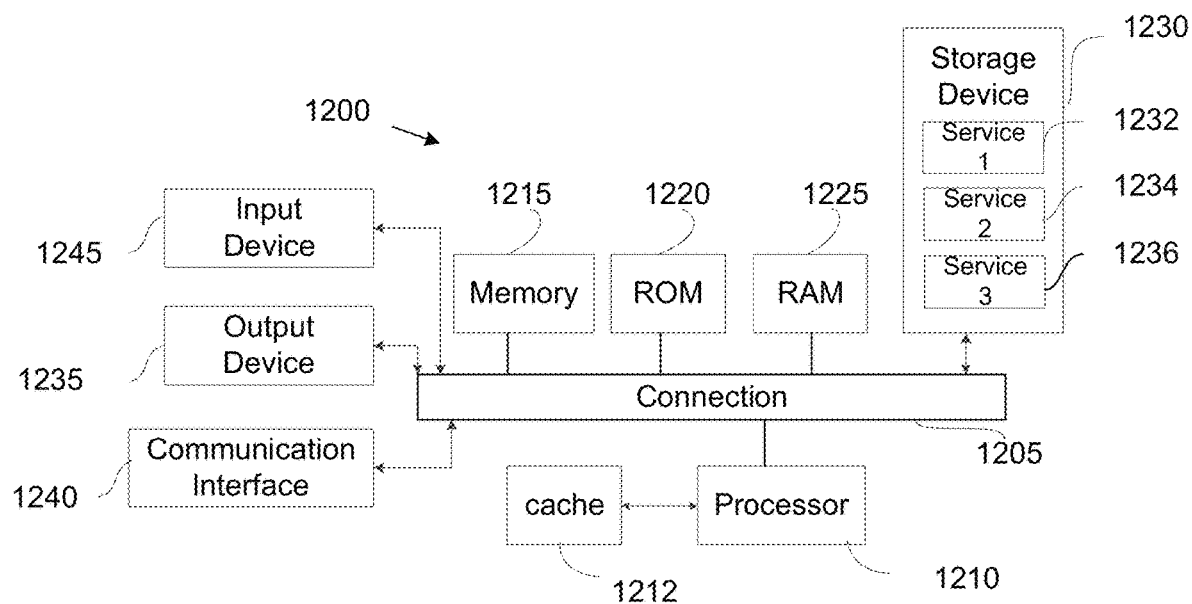
FIG. 12 shows an example computing system, which can be for example any computing device that can implement components of the system.

FIG. 12 illustrates an example computing system 1200 including components in electrical communication with each other using a connection 1205 upon which one or more aspects of the present disclosure can be implemented. Connection 1205 can be a physical connection via a bus, or a direct connection into processor 1210, such as in a chipset architecture. Connection 1205 can also be a virtual connection, networked connection, or logical connection.

In some embodiments computing system 1200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

Figure 13:
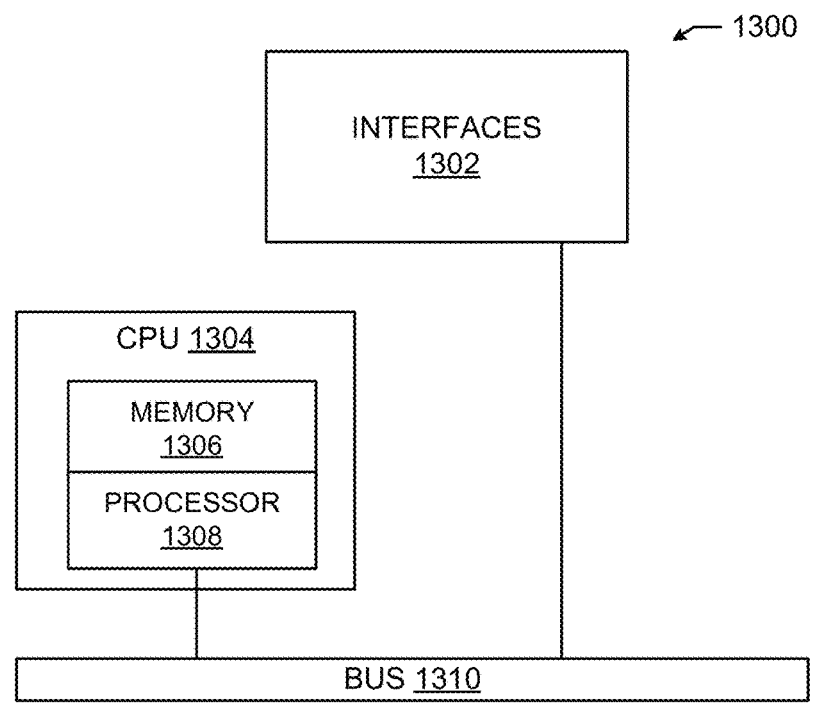
FIG. 13 illustrates an example network device.

FIG. 13 illustrates an example network device 1300 suitable for performing switching, routing, load balancing, and other networking operations. Network device 1300 includes a central processing unit (CPU) 1304, interfaces 1302, and a bus 1310 (e.g., a PCI bus). When acting under the control of appropriate software or firmware, the CPU 1304 is responsible for executing packet management, error detection, and/or routing functions. The CPU 1304 preferably accomplishes all these functions under the control of software including an operating system and any appropriate applications software. CPU 1304 may include one or more processors 1308, such as a processor from the INTEL X86 family of microprocessors. In some cases, processor 1308 can be specially designed hardware for controlling the operations of network device 1300. In some cases, a memory 1306 (e.g., non-volatile RAM, ROM, etc.) also forms part of CPU 1304. However, there are many different ways in which memory could be coupled to the system.

The interfaces 1302 are typically provided as modular interface cards (sometimes referred to as "line cards"). Generally, they control the sending and receiving of data packets over the network and sometimes support other peripherals used with the network device 1300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1304 to efficiently perform routing computations, network diagnostics, security functions, etc.

Although the system shown in FIG. 13 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1300.

Regardless of the network device's configuration, it may employ one or more memories or memory modules (including memory 1306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1306 could also hold various software containers and virtualized execution environments and data.

The network device 1300 can also include an application-specific integrated circuit (ASIC), which can be configured to perform routing and/or switching operations. The ASIC can communicate with other components in the network device 1300 via the bus 1310, to exchange data and signals and coordinate various types of operations by the network device 1300, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A system comprising:
   at least one processor; and
   at least one memory storing instructions, which when executed by the at least one processor, cause the system to:
   detect an unreachability of at least one Provider Edge (PE) device in a network;
   determine, via area border routing (ABR) analysis, that a route summarization is used within the network, wherein the unreachability of the at least one PE device is hidden by the route summarization; and
   transmit a failure message informing other PE devices of the unreachability of the at least one PE device.

2. The system of claim 1, wherein the network includes at least one non-organized structure configured to add an attribute within the failure message.

3. The system of claim 2, wherein the at least one non-organized structure is built automatically.

4. The system of claim 2, wherein the attribute includes a negative pulse message configured for loop prevention.

5. The system of claim 2, wherein the attribute is an identifier for loop prevention.

6. The system of claim 1, wherein the network includes at least one distribution structure.

7. The system of claim 6, wherein the distribution structure is a tree structure.

8. The system of claim 6, wherein the distribution structure is a full-mesh structure.

9. The system of claim 6, wherein the distribution structure is an automated loop-free distribution structure based on a service discovery protocol and predetermined propagation rules.

10. The system of claim 1, wherein the distribution structure is associated with one or more rules configured to avoid loops.

11. The system of claim 1, wherein the ABR analysis includes:
    analyzing routing data to detect ABR and summary generation.

12. The system of claim 1, wherein the ABR analysis includes:
    analyzing ABR configuration data.

13. The system of claim 1, wherein the failure message informs the other PE devices about the unreachability of a prefix of the at least one PE device that is part of a summary route.

14. The system of claim 1, wherein the other PE devices are determined based on at least one of a specific prefix or a set of prefixes belonging to an aggregate.

15. The system of claim 1, further comprising instructions, which when executed by the at least one processor, cause the system to:
    transmit the failure message about the unreachability of the at least one PE device to a pulse distribution agent, the pulse distribution agent configured to transmit the failure message to one or more PE devices connected to the pulse distribution agent.

16. A method comprising:
    detecting an unreachability of at least one Provider Edge (PE) device in a network;
    determining, via area border routing (ABR) analysis, that a route summarization is used within the network, wherein the unreachability of the at least one PE device is hidden by the route summarization; and
    transmitting a failure message informing other PE devices of the unreachability of the at least one PE device.

17. The method of claim 16, wherein the network includes at least one non-organized structure configured to add an attribute within the failure message.

18. The method of claim 16, wherein the network includes at least one distribution structure.

19. The method of claim 18, wherein the distribution structure is one of a tree structure, mesh structure, or automated loop-free structure.

20. The method of claim 16, wherein the failure message informs the other PE devices about the unreachability of a prefix of the at least one PE device that is part of a summary route.

* * * * *